United States Patent [19]

St. Onge

[11] Patent Number: 4,958,959

[45] Date of Patent: * Sep. 25, 1990

[54] METHOD OF RELINING SEWERS AND WATER LINES WITHOUT EXCAVATION

[75] Inventor: Henri S. St. Onge, Scarborough, Canada

[73] Assignee: Duratron Systems Limited, Scarborough, Canada

[*] Notice: The portion of the term of this patent subsequent to Jan. 10, 2006 has been disclaimed.

[21] Appl. No.: 294,754

[22] Filed: Jan. 9, 1989

Related U.S. Application Data

[63] Continuation of Ser. No. 892,875, Jan. 13, 1986, Pat. No. 4,796,669, which is a continuation of Ser. No. 284,442, Jul. 17, 1981, abandoned.

[51] Int. Cl.$^5$ .............................................. F16L 1/036
[52] U.S. Cl. ..................................... 405/184; 138/97; 405/156
[58] Field of Search ............... 405/154, 156, 157, 184; 138/97, 105, 155

[56] References Cited

U.S. PATENT DOCUMENTS

| | | | |
|---|---|---|---|
| 2,926,701 | 3/1960 | Campbell | 138/97 |
| 3,508,771 | 4/1970 | Duret | 285/334 |
| 4,796,669 | 1/1989 | St. Onge | 138/97 |

FOREIGN PATENT DOCUMENTS

| | | | |
|---|---|---|---|
| 2242833 | 3/1974 | Fed. Rep. of Germany | 138/97 |
| 24321 | 2/1977 | Japan | 138/97 |
| 116733 | 9/1979 | Japan | 138/97 |

OTHER PUBLICATIONS

Nipak Bulletin, "Sewer Renewal by Inspection with Nipak Polyethylene Pipe", Dallas, Texas, Nipak (by 5/9/73 or earlier).
St. Onge, H. S., "Updating Aging Sewers Without Trenching", Engineering and Contract Record, Jul., 1974, pp. 40-44.

*Primary Examiner*—David H. Corbin

[57] ABSTRACT

A method is disclosed for relining buried pipeline with interconnectable plastic type pipe sections. The method comprises gaining access to an open end of the buried pipeline, such as through a manhole, passing pipe sections down the manhole and inserting individually each pipe section into the buried pipeline open end. Each pipe section is of a length to permit, within the confines of the manhole, insertion of each pipe section into the pipeline open end. Each pipe is of a diameter to fit within the pipeline. The pipe section to be inserted is interconnected to the pipe section already inserted within the buried pipeline. Such interconnected sections are sequentially moved into the buried pipeline to permit insertion of the next pipe section into buried pipeline until the entire length of the pipeline to the next access area has been relined.

6 Claims, 5 Drawing Sheets

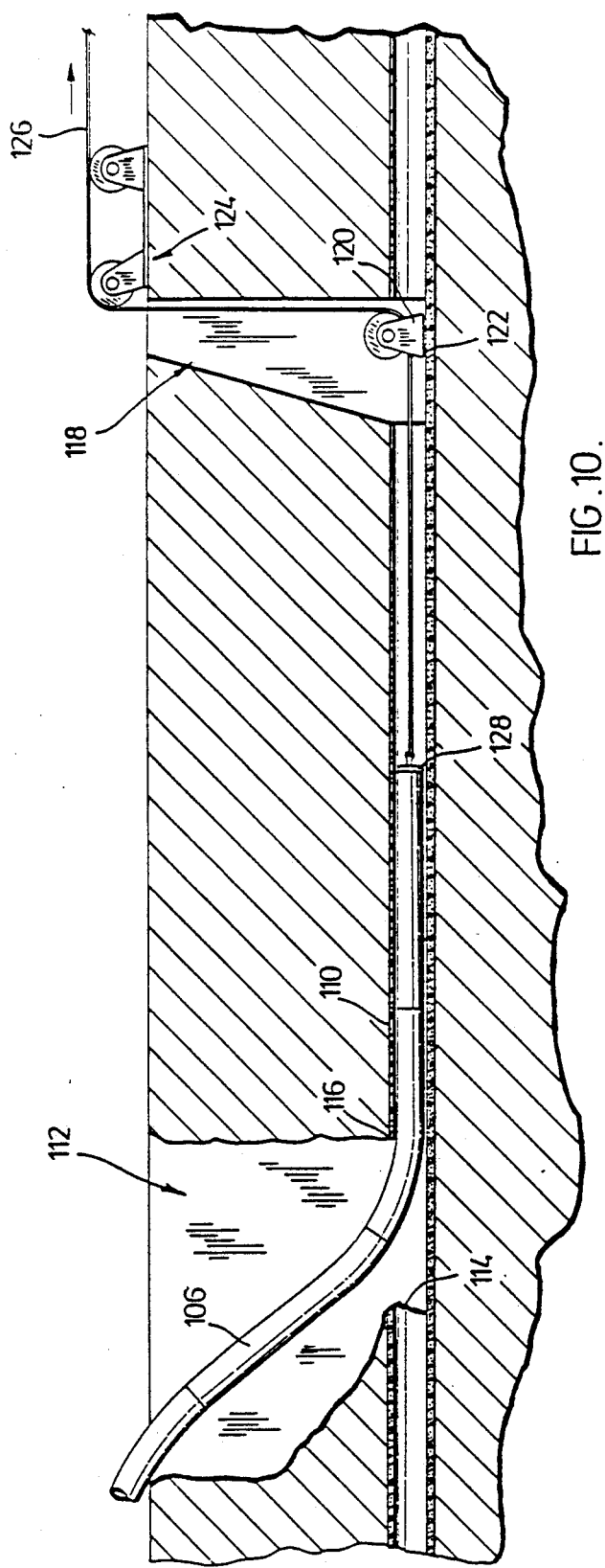

METHOD OF RELINING SEWERS AND WATER LINES WITHOUT EXCAVATION

This is a continuation of application Ser. No. 892,875 filed Jan. 13, 1986 which is U.S. Pat. No. 4,796,669 and which is a continuation of application Ser. No. 284,442 filed July 17, 1981 now abandoned.

FIELD OF THE INVENTION

This invention relates to a method for relining buried pipelines and product used in relining such pipelines.

BACKGROUND OF THE INVENTION

There are many situations where there is a requirement to replace or repair pipelines in densely populated areas or inaccessible areas. The normal procedure for many years, which is particularly troublesome in congested cities, is to close off a street, dig up a buried damaged pipeline, install the new pipeline and repair the street. This is commonly done with city sewer and storm drain lines. However, there are many other areas where inaccessible faulty pipelines need to be relined.

To reduce the need to dig a trench along the entire length of the pipeline to be replaced, this has been overcome by a process of inserting within a pipeline requiring replacement a plastic pipe liner. Such a method of relining sewer pipe is disclosed in Bremner, U.S. Pat. No. 3,602,263. In his method as particularly directed to the relining of sewer mains, a reaming device is first passed through the old sewer line to remove tree roots, calcium deposit caked on the pipewalls and the like. A plastic pipe is passed through the reamed sewer line, the plastic pipe being of a lesser diameter than the reamed sewer line to form the new interior for the sewer line. The plastic piping, as fed into the sewer line, is commonly of polyethylene pipe where lengths of pipe are interconnected by the process of butt fusion welding, where the ends of pipe lengths to be joined are melted and in their softened state, connected to one another. Depending upon the length of the sewer line to be relined, this determines the number of pipe sections which are joined together. Commonly the pipe sections are of fifty foot lengths and are interconnected by using expensive, difficult to operate butt fusion welding equipment. Such equipment requires skilled personnel on the job site.

Another approach in relining sewer lines and other buried service pipelines is disclosed in Levens, U.S. Pat. No. 3,950,461 and St. Onge, Canadian patent No. 1,033,197. In these patents, improved techniques are disclosed for connecting lateral sewer lines to a relined main sewer line. Such interconnection is made from a remote location within the house or building via the lateral sewer line.

The drawback of the above processes for relining buried pipelines is that, aside from the requirement of butt fusion welding to interconnect lengths of pipe to be drawn into the pipeline to be relined, it still requires excavation and interruption to the flow of vehicle traffic.

As to the aspect of interconnecting pipe sections, mechanical interconnection of pipe sections have been used, such as in the oil drilling field. Drill strings are mechanically interconnected as shown in Knox et al, U.S. Pat. No. 3,359,013, Duret, U.S. Pat. No. 3,508,771 and Hokanson et al, U.S. Pat. No. 3,667,784. However, in these arrangements the drill strings or casing joints are formed of steel and would be totally unacceptable for use in relining buried pipeline, because of their rigidity. Insofar as mechanical interconnection of larger diameter plastic pipe is concerned, clamps have been used, for example, as supplied by DuPont Canada and sold under the trademark Sclairloc. Such couplings add large projections to pipe exterior making it unacceptable for relining pipelines by insertion renewal.

The method, according to this invention, provides for the relining of buried pipeline, where access thereto is difficult or impossible by excavation. The method provides for relining the pipeline without disturbing the surrounding street vehicle traffic by taking advantage of already provided accesses to the buried pipelines such as by manholes.

SUMMARY OF THE INVENTION

The method, according to this invention, for relining a buried pipeline with interconnectable plastic pipe sections comprises gaining access to an open end of the buried pipeline and passing pipe sections through the access area. Each pipe section is individually inserted into the buried pipeline open end, where each pipe section is of a length to permit within the confines of the access area insertion of each pipe section into the pipeline open end and is of a diameter to fit within the pipeline. The pipe section to be inserted into the pipeline is interconnected with a pipe section already inserted in the pipeline. The interconnected pipe sections are sequentially moved after each interconnection into the buried pipeline to permit insertion and interconnection of the next pipe section into the buried pipeline.

The length of plastic pipe for use in relining buried pipelines is made from a plastic selected from the group consisting of polyethylene, polypropylene and polyvinylchloride. The pipe is substantially straight and has its ends adapted for interconnection of its ends to other like pipe lengths. The mating interconnection of pipe ends retains its integrity as interconnected lengths of pipe are moved within the buried pipeline to reline same. According to an aspect of the invention, male and female end portions are provided on each length of pipe which form a mating interconnectable interfit. Such male and female end portions may be buttress type threads, whereby relative rotation of each pipe section provides for a secure interconnection of the sections.

BRIEF DESCRIPTION OF THE DRAWINGS

Preferred embodiments of the invention are shown in the drawings wherein:

FIG. 10 is a side elevation of a job site showing the pulling of interconnected lengths of plastic pipe into a buried pipeline to be relined.

DETAILED DESCRIPTION OF THE PREFERRED EMBODIMENTS

Figure 1:
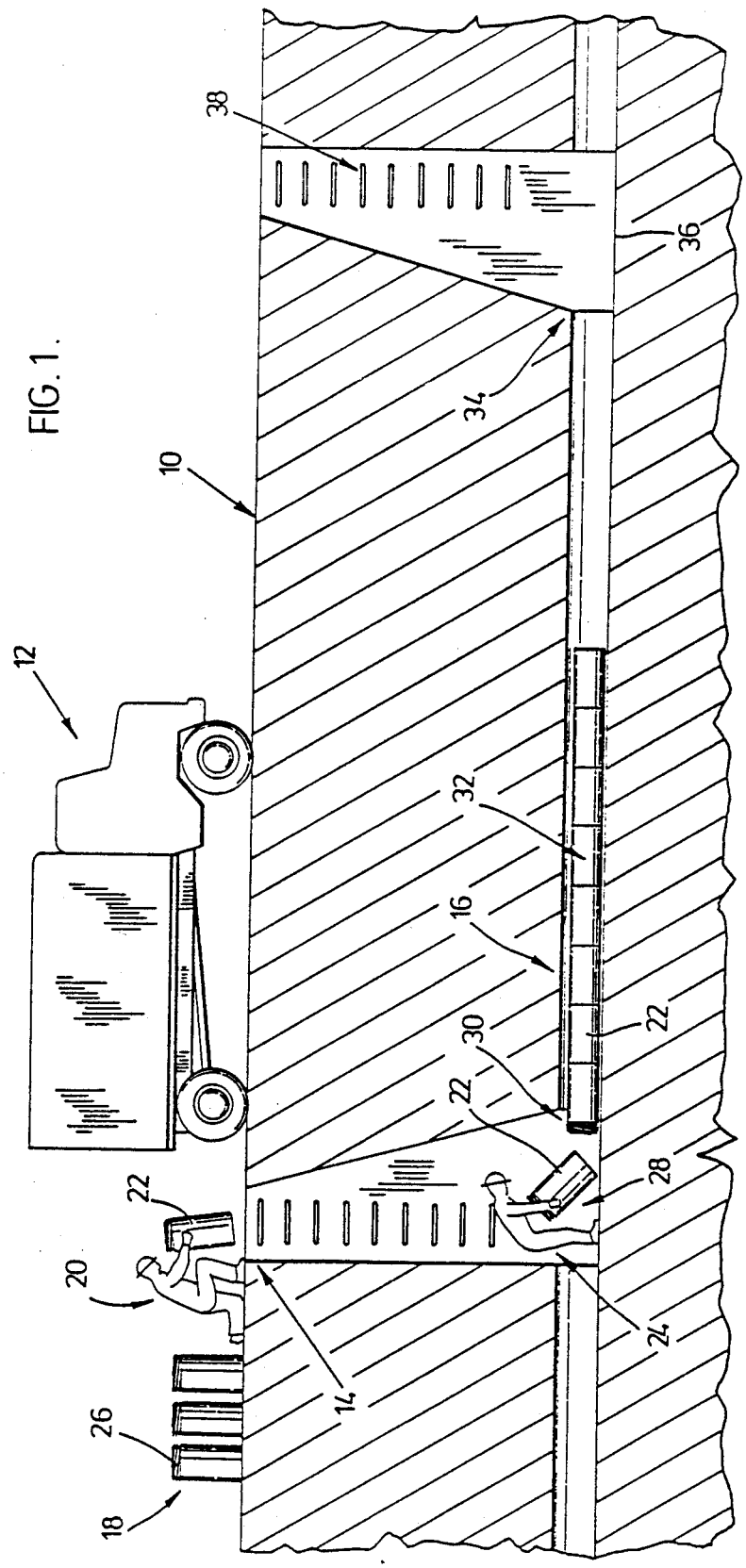
FIG. 1 is an elevation of a job site showing the relining of a buried pipeline according to the invention.

Referring to FIG. 1, a typical buried sewer line or stormdrain line is shown for purposes of illustrating the method according to the invention. It is appreciated, however, that the method is applicable to relining many other types of buried pipelines which, for one reason or another, are inaccessible, such as, lines for carrying corrosive chemicals, gasolines, oil lines, low pressure waterlines and the like. A typical street surface 10 has a service vehicle 12 parked adjacent a manhole 14 which provides access to a sewer line 16 which is to be relined. The reason for the reline is usually due to corrosion, cracks resulting in a leak somewhere along the line which must be repaired. The sections or lengths of pipe generally shown at 18 are stacked behind an operator 20 who lowers each pipe section 22 down the manhole 14. An operator 24 is at the base of the manhole 14 and receives pipe 22 which is lowered down or through the access. The lengths or sections of pipe 22 are as shown and have provided at one end a male threaded portion 26 and a female threaded portion at the other end which is more clearly shown in FIG. 4. The sections of pipe are placed in the buried pipeline 16 where each section is interconnected to the other before moving the interconnected sections sequentially into the pipeline 16. Each length of pipe 22 is such that it may be readily maneuvered within the confines of the lower area 28 of the manhole, so that the pipe may be oriented for insertion into the open end portion 30 of the pipeline, interconnected to the other sections of pipe and then moving the interconnected sections into the pipeline.

This procedure is repeated until a sufficient number of pipe lengths 22 have been interconnected and inserted into the pipeline to form a length of interconnected sections, as generally indicated at 32, so as to project from the other open end at 34 of the pipeline into the lower portion 36 of a manhole 38. At this point, the insertion of pipe sections is ceased and the connections, if needed, are secured to provide insertion renewal of faulty buried pipe 16. The ends of the pipe length 32 are sealed to the openings 30 and 34 so that all liquid running into the manhole areas 28 an 36 now pass into the interconnected length of piping 32. Special grouting materials, which set in water, may be used to seal the ends of the completed pipe section 32 to the openings 30 and 34 for the pipeline 16.

It is apparent that this process does not require any excavation of the pipeline system 16, nor does it require any stoppage in flow of waters or liquids along the line 16, since the operator with appropriate attire may stand at the base of the manhole and insert and interconnect these sections while liquid runs around the sections along the old pipeline 16.

Figure 2:
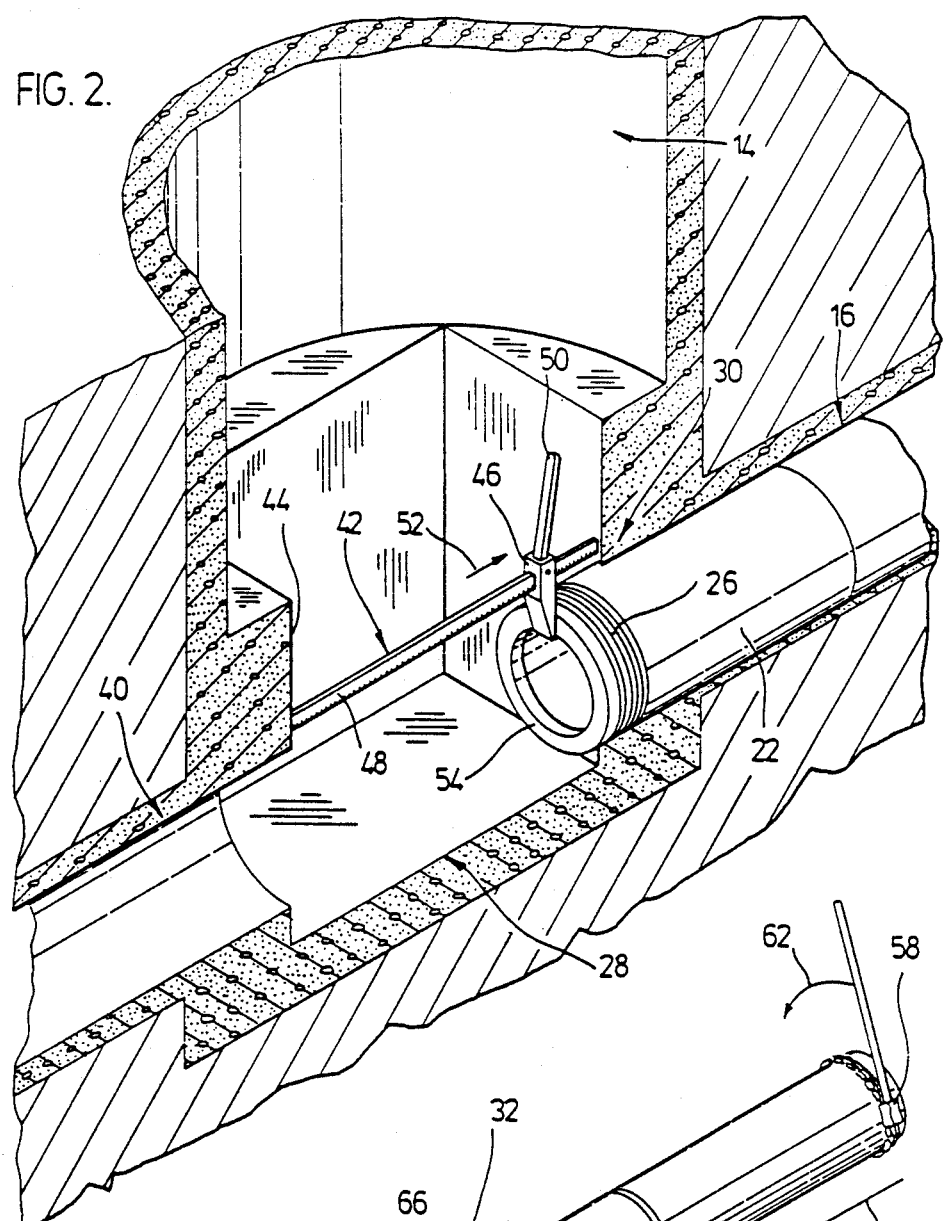
FIG. 2 is a sectional elevation demonstrating a technique for moving connected sections of pipe lengths into the buried pipeline.
Figure 3:
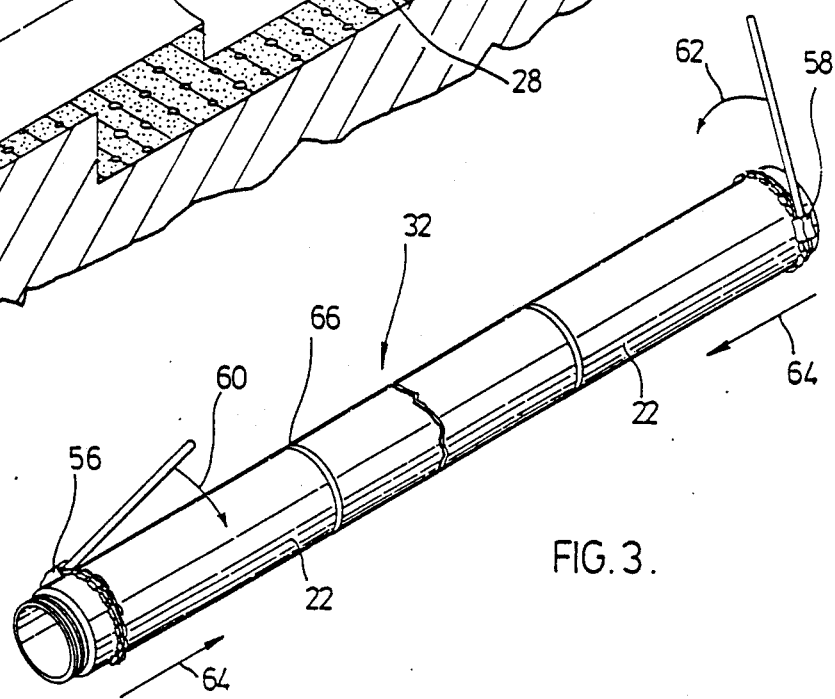
FIG. 3 shows a plurality of pipe lengths interconnected by cooperation of male and female threads, where relative rotation of the sections forms a secure interconnection.

Further aspects of the insertion and interconnection of the pipe lengths are shown in FIGS. 2 and 3. The base of the manhole is shown at 28 on which the workman may stand. Sewer line 40 runs into this area and flows into sewer line 16 which has its opening at 30. Each pipe section is inserted in the sewer line 16 as shown at 22. Due to the nature of the pipe being made of plastic such as polyethylene, polypropylene or polovinylchloride, the interconnected sections of piping 32 may take on various slight curvatures in the pipeline 16. The diameter of the pipe length 22 is less than the internal diameter of the pipeline to be relined to permit easy insertion of the sections into the pipeline and also movement of the interconnected sections 32 along the pipeline. To facilitate forcing of the interconnected sections of piping 32 into the pipeline 16, particularly should it have a curvature or bend, a power drive device is used. As shown in FIG. 2, the sections 32 are pushed into the pipe 16 by a power drive in the form of a jack 42 which is positioned against wall 44 of the manhole 14 and the jack ratchet 46 climbs the bar 48 of the jack 42 by operation of the hand lever 50 to push the interconnected pipe sections into the pipeline 16 in the direction of arrow 52. To protect the threaded end 26 of the pipe 22, a plate 54 may be placed over or adapted to be threaded onto a portion of the thread 26 against which the ratchet plate 46 abuts. Once the pipe has been inserted to the desired extent into the pipeline 16, the protective plate 54 may be removed to permit interconnection of the next section of pipe 22.

It is appreciated that other power drive mechanisms may be used to force the interconnected piping 32 into the pipeline 16. For example, a device may be lowered into the manhole 14 which works on the basis of air pressure or hydraulic pressure to push the interconnected sections into the pipeline 16.

As shown in FIG. 3, the securing of interconnect sections of pipe 22 to form a length of interconnected sections 32 is shown. In placing and interconnecting the pipe sections in the pipeline 16, they need not be tightly secured to one another simply loosely hand threaded. However, once the piping 32 projects from the other end 34 into the access area 36, chain clamps 56 and 58 may be secured over the projecting ends of the new pipe liner 32 and counterrotated in the directions of arrows 60 and 62 to tighten the threaded interconnections and thus cause an overall compression in the length of the pipeline in the direction of arrows 64. It is appreciated that several turns on the ends of the interconnected sections 32 are required so that there is in essence a sequential transfer of torque along the sections as each joint 66 in the series is firmly secured.

Figure 4:
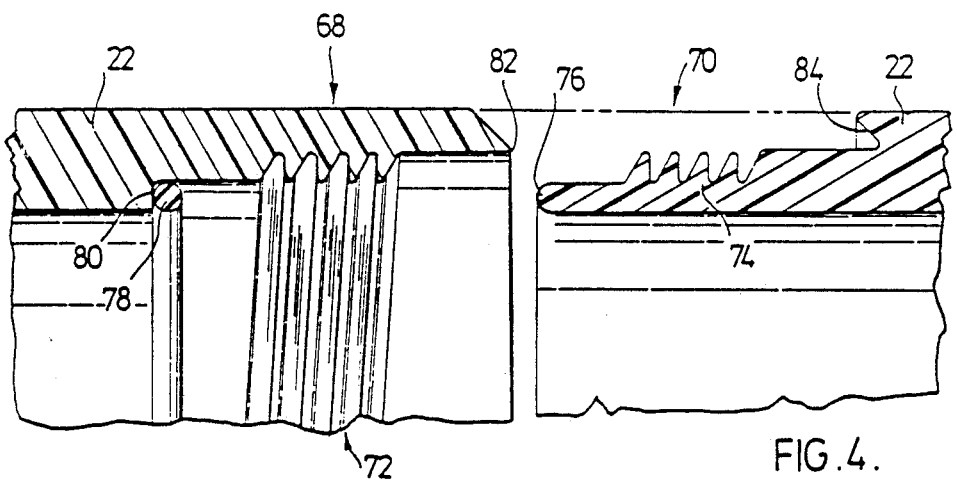
FIG. 4 is a section of two lengths of pipe about to be joined, where male and female buttress type threads are provided on the interconnectable ends.
Figure 5:
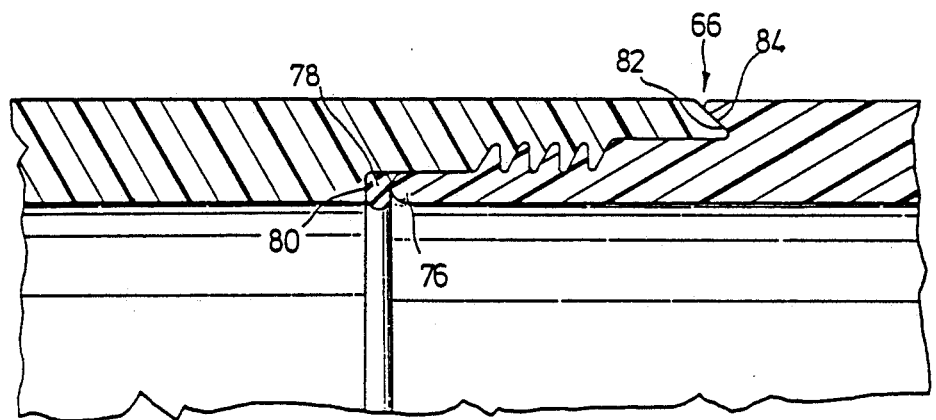
FIG. 5 shows the interconnection of the pipe ends of FIG. 4.

With regard to the tightening of the joint and its manner of operation, this is discussed in more detail with respect to FIGS. 4 and 5. In FIG. 4, pipe sections 22 have on their end portions generally designated at 68 and 70 a female threaded portion 72 and a male threaded portion 74. A buttress type thread is provided on each end portion to resist separation of the interconnected joint 66. The end 70, which includes the male portions, has a projection 76 which abuts a sealing member in the form of an "0" ring 78 which is seated against a recess defined by ledge 80. The female end portion 68 includes a wedge-shaped projection 82 which is received in a wedge-shaped recess 84 of the male portion 70. The dimensional relationship of these projections and recesses is such to provide a secure interconnection, as shown in FIG. 5. The wedge-shaped projection 82 firmly seats in the recess 84 in an overlapping fashion to provide a smooth surface along the joint 66, where there is no bulge in the external diameter of the pipe in the area of the joint 66. Thus, an essentially smooth surface for the interconnected sections 32 of the relining pipe is provided so as to be easily inserted into the pipeline 16. As the sections are tightened on one another, the projection 76 deforms and squeezes the "O" ring seal 78 against the ledge 80 to provide an interior seal for the joint 66 to thereby prevent liquids leaking out of the joint. Such an arrangement is particularly useful when the relined pipeline is used in transporting liquids which may be under low pressure.

With the use of the buttress thread arrangement of FIG. 4, an additional feature is realized in that, as shown in FIG. 5, with projection 82 seated in the recess 84, upon pushing the interconnect sections 32 into the pipeline 16, stops are provided so as to maintain integrity of the joint while being pushed into the pipeline. Such interaction prevents the female portion of the interconnection sliding on up over the male portion and resulting in a faulty joint.

Figure 6:
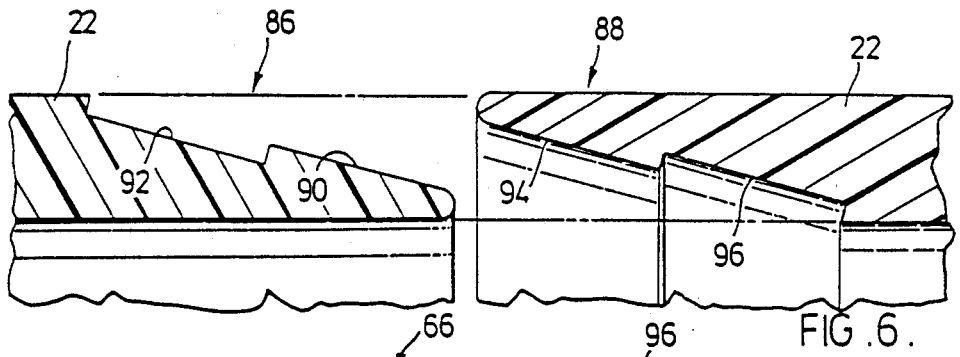
FIGS. 6 and 7 show a type of snap-fit interconnection of male and female components.
Figure 7:
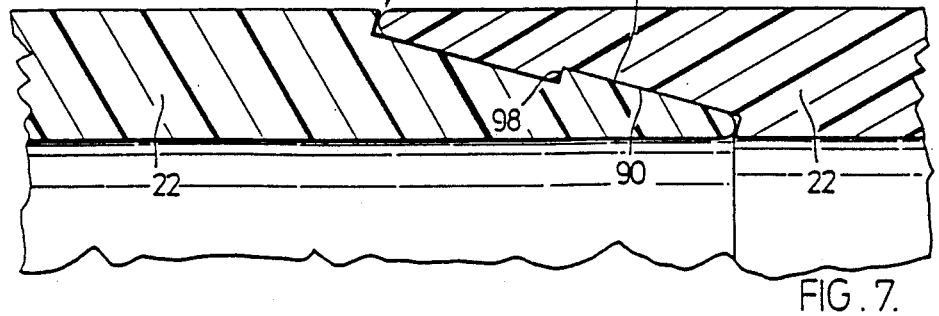

Alternative forms of pipe interconnections for the sections of FIG. 1 are shown in FIGS. 6 through 9. In FIG. 6, the pipe sections 22 have a formed male portion at 86 and a formed female portion at 88 which have a snap-fit interconnectable relationship. The male portion 86 includes a ramp 90 with a recessed portion 92. The female portion 88 includes a ramp 94 with inwardly disposed recessed portion 96. When the pipe sections 22 are pushed towards one another, the female section 88 expands slightly outwardly as the male section 86 contracts slightly to permit the sections to snap over one another. Ramp 94 rides up over ramp 90 so that the male projecting portion 90 snaps into the receiving recess 96 of the female portion, where the interaction of their abutting shoulders at 98 forms a secure interconnection of the pipe sections 22. The connection is such that the exterior of the joint 66 is essentially smooth to provide interconnected sections of piping 32 which is essentially of consistent diameter along the length of the reliner pipe. Such snap interconnections are convenient in situations where a forcing of the pipe sections into the pipeline results in the sections snapping together.

Figure 8:
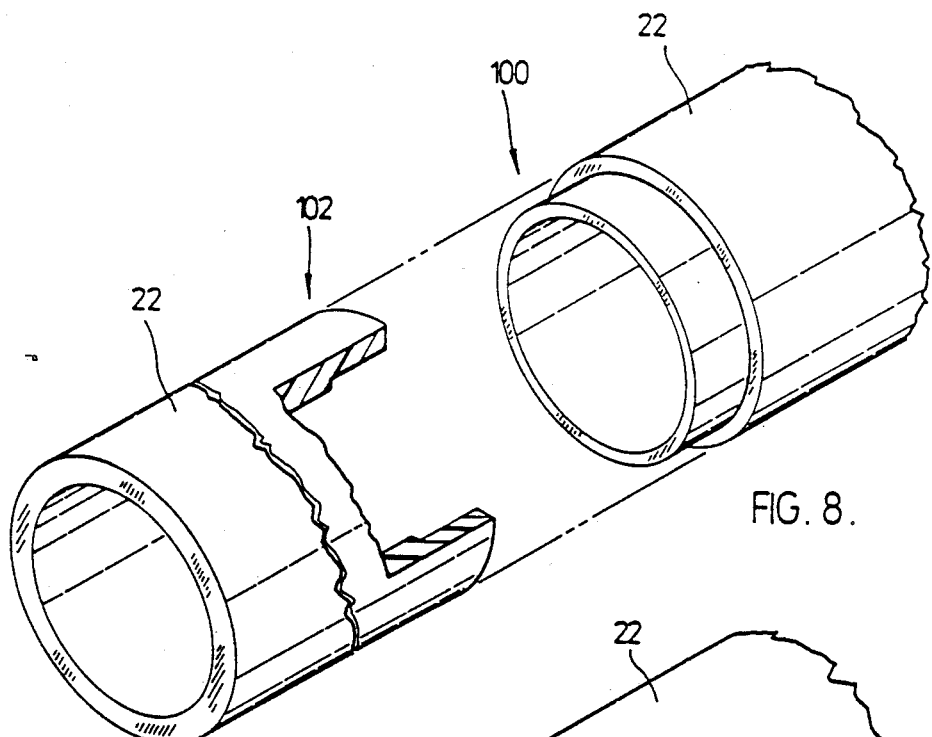
FIG. 8 shows the ends of two pipe lengths adapted with male and female interconnections.
Figure 9:
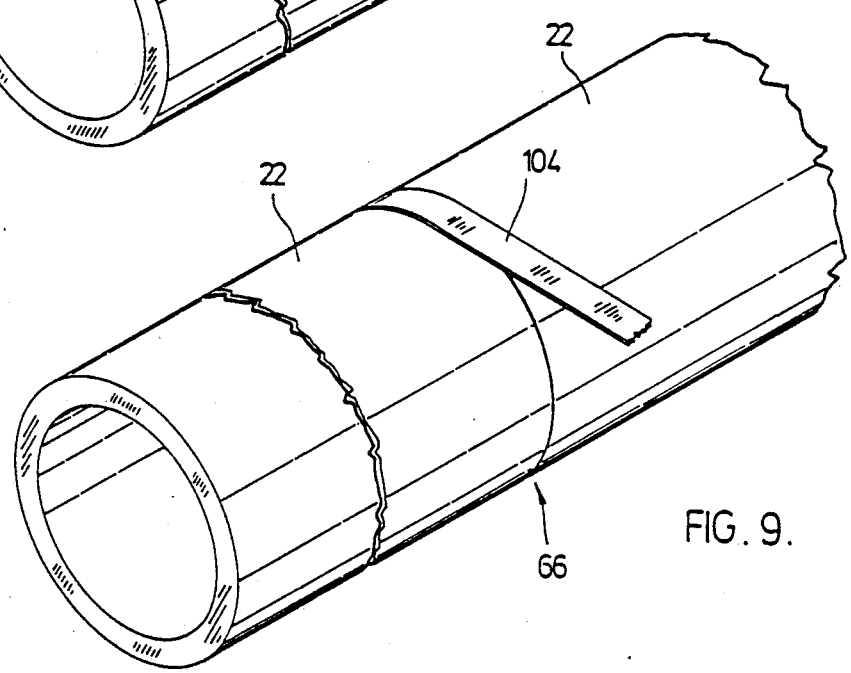
FIG. 9 shows the wrapping of a bonding agent about the joint to secure the interconnection.

FIG. 8 shows another approach to interconnecting of the pipe sections 22 where one section has a male portion 100 and the other section has a female portion 102. The relationship is such to form an interfit, where the exterior of the pipeline remains essentially smooth as shown in FIG. 9 at joint 66 and the interior diameter is also essentially consistent across the joint. A bonding agent 104 is applied to the joint 66. This bonding agent may be in the form of a special pressure-sensitive adhesive tape which is wrapped about the joint to form the interconnection, or it may be of a special material which, after wrapping about the joint, is shrunk around the joint by the application of heat to form a shrink wrap and secure interconnection of the pipe sections 22.

Referring to FIG. 10, another aspect of the invention for interconnecting pipe sections in relining buried pipeline is shown. Sections of pipe 106 may be interconnected mechanically, in accordance with this invention, and pulled into a buried pipeline 110 which needs to be relined. To facilitate pulling of the sections 106 into the buried pipeline 110, excavation is required in the area 112 to provide sufficient access such that the pipe interconnected sections may curve in the manner shown, as pulled into the pipeline 110. Thus, the pipeline is broken at 114 and 116 to provide an access opening at 116. At the manhole 118, a sheave 120 is secured in the lower area of the manhole at 122 and a sheave arrangement 124 is provided at the top of the manhole to guide the cable 126 to a winch not shown. A pulling head 128 is secured to the leading pipe section 106 where the pulling head 128 is adapted to be mechanically connected to the leading pipe section, for example by way of threading onto the female end portion of a threaded pipe section, such as shown in FIG. 4 at 68.

The pipe sections 106 may be of longer lengths in view of the access provided at 112, where the pipeline 110, to be relined in this instance, may be of several hundred feet such as 500 to 1,000 feet of pipe to be relined at one time. This approach is superior to the butt fusion welding approach, in that no special tools are required because the sections can be readily assembled on site by simply twisting or snapping the sections together. The buttress thread is particularly useful in providing the interconnection, because it has a high degree of resisting separation while being pulled through the pipeline 110. With this arrangement, the diameter of the pipe sections is such to be slightly less than the mainline 110. This permits liquid to run around the pipe sections as they are being inserted into the pipeline 110.

This approach provides several advantages including the elimination of any external or internal couplings, where there are no interior projections within the pipe which would disturb the flow of liquids. The pipe sections can be readily dismantled for reservicing, since the plastic material does not corrode. The use of threaded interconnections facilitates bending along the length of interconnected sections as they are forced around various curves in the pipeline 110.

The method, according to this invention, and the pipe sections thereof provide for a very useful form of relining pipelines particularly in congested city areas where disruption of the street is kept to a minimum. A service vehicle may be parked at one manhole, an operator inserts the sections into the pipeline, forces them into position and seals the exposed ends to the manhole openings. This may all be accomplished in one day, which would normally take at least four times that long with prior methods.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A method of relining a buried pipeline with interconnectable plastic pipe sections of an appropriate diameter for insertion within the buried pipeline, each section having a male connection at one end and a female connection at the other end with said female connection and male connection being sized to cooperate with an opposite connection and form a locked fit between said connections such that said connections cannot be inadvertently axially withdrawn one from the other, said method comprising bringing short pipe sections to an open end of the buried pipeline,
- aligning an individual pipe section with the buried pipeline such that the pipe section is on grade with the buried pipeline,
- effecting a connection between any pipe section previously immediately inserted in said pipeline to form the locked fit between the sections,
- forcing said connected pipe sections into the buried pipeline by either pulling or pushing said sections in preparation for the insertion of the next pipe section into the buried pipeline.

2. A method as claimed in claim 1, wherein said step of effecting a locking fit between said pipe sections is accomplished by forcing one pipe section into the other until the locked fit is achieved.

3. A method as claimed in claim 1, wherein said step of effecting a locking fit between said pipe sections is accomplished by axially rotating one pipe section relative to the other thereby screwing one section into the other.

4. A method as claimed in claim 1, wherein said pipe sections are brought to the open end of a buried pipeline through a manhole associated with the open end of the buried pipeline and said pipe sections are aligned with the buried pipeline within the manhole.

5. A method as claimed in claim 1, including continuing to insert and lockingly fit pipe sections and move the sections along the buried pipeline until the leading interconnected pipe section emerges from a remote opening of the buried pipeline at another access area.

6. A method as claimed in claim 1, wherein said step of bringing short pipe sections to an open end of a buried pipeline is accomplished by passing said sections individually through an existing manhole associated with said buried pipeline in preparation for aligning individual sections with the buried pipeline within the manhole.

* * * * *